United States Patent
Horikiri et al.

(10) Patent No.: US 7,752,187 B2
(45) Date of Patent: Jul. 6, 2010

(54) DOCUMENT MANAGEMENT SYSTEM, DOCUMENT MANAGEMENT METHOD, AND RECORDING MEDIUM STORING PROGRAM FOR DOCUMENT MANAGEMENT

(75) Inventors: Kazunori Horikiri, Tokyo (JP); Masatomi Inagaki, Tokyo (JP); Yoshiki Watanabe, Tokyo (JP); Eriko Tamaru, Yokohama (JP); Hitoshi Abe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 329 days.

(21) Appl. No.: 11/403,705

(22) Filed: Apr. 13, 2006

(65) Prior Publication Data

US 2006/0248077 A1 Nov. 2, 2006

(30) Foreign Application Priority Data

Apr. 28, 2005 (JP) ............................. 2005-130993
Jan. 17, 2006 (JP) ............................. 2006-008524

(51) Int. Cl.
*G06F 7/00* (2006.01)

(52) U.S. Cl. ..................................................... 707/705
(58) Field of Classification Search ..................... 707/1, 707/2, 3, 9
See application file for complete search history.

(56) References Cited

U.S. PATENT DOCUMENTS

| | | | |
|---|---|---|---|
| 5,787,414 A * | 7/1998 | Miike et al. ..................... 707/2 |
| 6,178,422 B1 | 1/2001 | Tada | |
| 6,317,777 B1 | 11/2001 | Skarbo et al. | |
| 6,483,610 B1 | 11/2002 | Burns | |
| 6,629,129 B1 | 9/2003 | Bookspan et al. | |
| 6,957,229 B1 | 10/2005 | Dyor | |
| 7,502,606 B2 | 3/2009 | Flynt et al. | |

(Continued)

FOREIGN PATENT DOCUMENTS

CN  1577324  2/2005

(Continued)

OTHER PUBLICATIONS

"Outlook 2002 Tour-Streamline Group Planning" http://web.archive.org/web/20021201123745/www.microsoft.com/office/outlook/evaluation/tour/page3.asp,archived, Dec. 1, 2002, posted May 30, 2001, 4pp.

(Continued)

*Primary Examiner*—Charles Rones
*Assistant Examiner*—Fazlul Quader
(74) *Attorney, Agent, or Firm*—Gauthier & Connors, LLP

(57) ABSTRACT

A scanned-document management system includes a first user identification information reading unit that acquires identification information of a user who operates a document reading unit. An attribute information generating unit acquires information of a user identified by the user identification information and generates attribute information based on the acquired information of the user. A document registration unit registers the document data and the attribute data in a document management unit. A second user identification information reading unit acquires identification information of the user. A request information generating unit acquires information of a user identified by the user identification information acquired by the second user identification information reading unit and generates document acquisition request information. A corresponding document selection unit selects document data related to the user based on document acquisition request information and the attribute information. A display control unit displays the selected document data.

4 Claims, 8 Drawing Sheets

U.S. PATENT DOCUMENTS

| | | |
|---|---|---|
| 7,568,005 B2 | 7/2009 | Nichols et al. |
| 2002/0019836 A1* | 2/2002 | Uchio et al. ................. 707/511 |
| 2003/0023587 A1 | 1/2003 | Dennis et al. |
| 2003/0164853 A1 | 9/2003 | Zhu et al. |
| 2004/0168133 A1 | 8/2004 | Wynn et al. |
| 2004/0264811 A1* | 12/2004 | Yano et al. ................... 382/306 |
| 2005/0004926 A1* | 1/2005 | Ohtani ....................... 707/100 |
| 2005/0105116 A1* | 5/2005 | Kobashi .................... 358/1.12 |
| 2005/0131714 A1 | 6/2005 | Braunstein et al. |

FOREIGN PATENT DOCUMENTS

| | | |
|---|---|---|
| JP | 2002082968 | 3/2002 |
| JP | 2002290661 | 10/2002 |

OTHER PUBLICATIONS

Office Action from parent U.S. Appl. No. 11/268,347, mailed on Jul. 9, 2008.

Office Action issued on Aug. 8, 2008 from the Chinese Patent Office for corresponding Chinese Patent Application Serial No. 200510136951.2, with English translation.

Office Action mailed on Aug. 21, 2009, corresponding to U.S. Appl. No. 11/268,347.

* cited by examiner

CONFERENCE INFORMATION

| CONFER-ENCE ID | CONFER-ENCE NAME | MEMBER | LOCATION | START TIME | END TIME |
|---|---|---|---|---|---|
| m1 | COMMOD-ITY DEVELOP-MENT | u1,u2,... | AKASAKA 10F | 05/04/02 10:00 | |
| m2 | PATENT INVESTI-GATION | u1,u7,u8,... | SHINJUKU 16F | 05/04/25 13:00 | |
| m3 | DESIGN REVIEW | u8,u9,... | | | |
| . . . | | | | | |

USER INFORMATION

| USER ID | CONFERENCE ID | PRESENT LOCATION |
|---|---|---|
| u1 | m1,m2 | AKASAKA 10F |
| u2 | m1,m5,m10 | SHINJUKU 16F |
| . . . | | |

SCANNER INFORMATION

| SCANNER ID | INSTALLA-TION LOCATION |
|---|---|
| s1 | AKASAKA 10F |
| s2 | SHINJUKU 14F |
| . . . | |

CONFERENCE ROOM INFORMATION

| CONFER-ENCE ROOM ID | LOCATION INFOR-MATION | SCANNER |
|---|---|---|
| r1 | AKASAKA 10F | s1 |
| r2 | SHINJUKU 16F | s4 |
| r3 | EBINA | NONE |
| . . . | | |

Fig. 3

SCANNED DOCUMENT INFORMATION

| DOCUMENT ID | SCANNING LOCATION | SCANNING DATE | CONFER-ENCE | OWNER |
|---|---|---|---|---|
| http://h/doc/id1 | AKASAKA 10F | 05/04/04 10:55 | COMMOD-ITY DEVELOP-MENT | u1 |
| http://h/doc/id3 | SHINJUKU 16F | 05/04/05 18:03 | PATENT INVESTI-GATION | u3 |
| ⋮ | | | | |

DOCUMENT ACQUISITION REQUEST INFORMATION (ATTRIBUTE INFORMATION)

| LOCATION | DATE | CONFERENCE | USER |
|---|---|---|---|
| AKASAKA 10F | 05/04/04 10:55 | COMMODITY DEVELOP-MENT | u1, u2, ... |

CONFERENCE INFORMATION

| CONFERENCE ID | CONFERENCE NAME | MEMBER | LOCATION | START TIME | END TIME | REPOSITORY INFORMATION |
|---|---|---|---|---|---|---|
| m1 | COMMODITY DEVELOPMENT | u1,u2,... | AKASAKA 10F | 05/04/02 10:00 | | www.aaa.co.jp/m1 |
| m2 | PATENT INVESTIGATION | u1,u7,u8,... | SINJUKU 16F | 05/04/25 13:00 | | www.aaa.co.jp/m2 |
| m3 | DESIGN REVIEW | u8,u9,... | | | | www.aaa.co.jp/m3 |
| ⋮ | | | | | | |

USER INFORMATION

| USER ID | CONFERENCE ID | PRESENT LOCATION | CARD ID |
|---|---|---|---|
| u1 | m1,m2 | AKASAKA 10F | c1 |
| u2 | m1,m5,m10 | SINJUKU 16F | c2 |
| ⋮ | | | |

SCANNER INFORMATION

| SCANNER ID | INSTALLATION LOCATION |
|---|---|
| s1 | AKASAKA 10F |
| s2 | SINJUKU 14F |
| ⋮ | |

CONFERENCE ROOM INFORMATION

| CONFERENCE ROOM ID | LOCATION INFORMATION | SCANNER |
|---|---|---|
| r1 | AKASAKA 10F | s1 |
| r2 | SINJUKU 16F | s4 |
| r3 | EBINA | none |
| ⋮ | | |

Fig. 8

EXAMPLE TRANSITION OF DISPLAY OF CONSOLE OF MULTIFUNCTION DEVICE
Fig. 9(a)
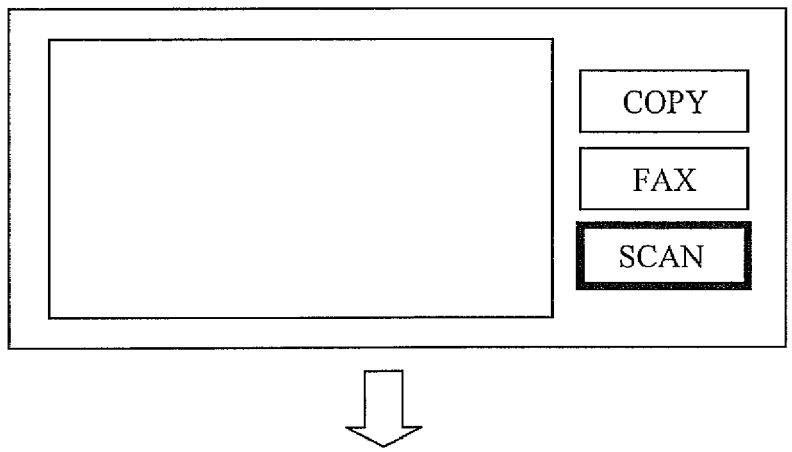
Fig. 9(b)
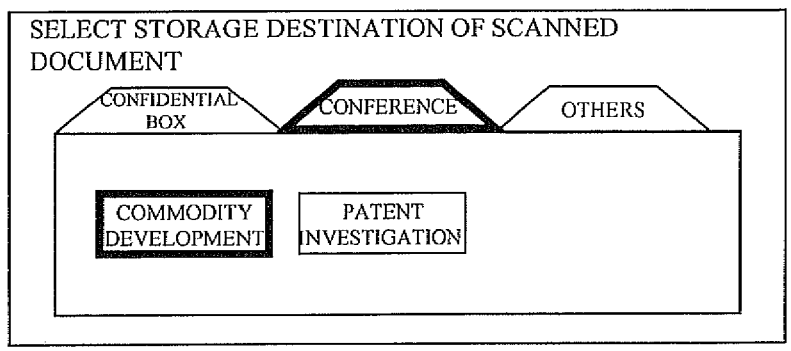
Fig. 9(c)
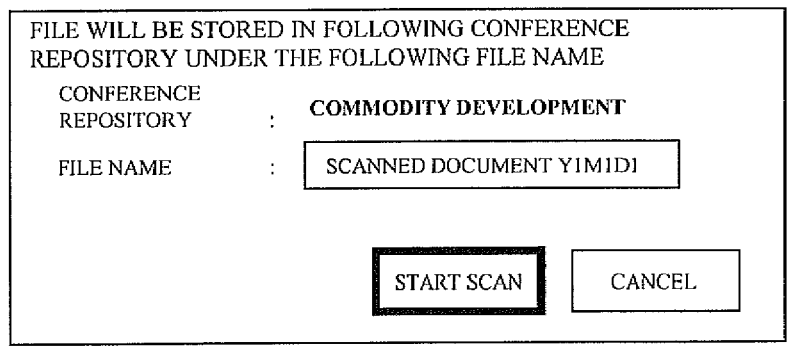

EXAMPLE TRANSITION OF SCREEN DISPLAY OF INFORMATION TERMINAL DEVICE

DOCUMENT MANAGEMENT SYSTEM, DOCUMENT MANAGEMENT METHOD, AND RECORDING MEDIUM STORING PROGRAM FOR DOCUMENT MANAGEMENT

PRIORITY INFORMATION

This application claims priority to Japanese Patent Application Nos. 2005-130993, filed on Apr. 28, 2005, and 2006-008524, filed on Jan. 17, 2006, which are incorporated herein by reference in their entireties.

BACKGROUND OF THE INVENTION (i) Technical Field

The present invention relates to a document scan management system and, more particularly, to acquisition of document data by means of a document scanning unit such as a scanner.

(ii) Related Art

In recent years, convenience and security of multifunction devices have been improved through addition of functions such as a scanner function, a privacy function, a network function, and the like. Because this increased functionality increases the applications and utility of the devices, it has become common for multifunction devices to be installed at locations other than office environments. For example, a multifunction device provided in a conference room may be used to scan a paper document for distribution to participants in a conference, or to convert the printed data to electronic data for editing. As a result, efficiency in conducting the conference can be increased. In a case where attribute information such as user information of a document owner is to be added to a scanned document which has been read by a scanner or the like and converted into electronic data, the attribute information has heretofore been input from a terminal disposed in combination with the scanner or an attribute sheet in which the attribute information is set is read together with the document scan and the scanned document is associated with the attribute information.

A certain user may wish to upload the scanned document of conference data (a paper document) into his or her personal computer (PC) by means of a multifunction device installed in a conference room in preparation for a conference at another facility of the company at which the user is employed. In this case, the user first obtains digital data for the paper document by means of the scanner function of the multifunction device. Then, the user verifies the model and the network address of the multifunction device, installs on his or her PC a driver usable for that model of multifunction device, and sets the appropriate network address. Furthermore, for security considerations, the user prepares a confidential box in the multifunction device, or obtains information (user ID, password, etc.) required for utilizing an existing confidential box.

However, obtaining appropriate information on the multifunction device, setting up the user's PC, and the like are laborious tasks which are often unrealistic. In addition, there is also a possibility that the user may not be able to properly set up his or her PC because he or she cannot obtain all the required information. For example, in the above-described conference, it can be imagined that the conference participants may wish to extract data from multiple participants, not just the single user described above.

In a conventional system, the user disadvantageously has to repeat operations of inputting and setting the attribute information as required for the multiple sources. An ability to read a document using a scanner function or the like of the multifunction device and to acquire the scanned document data with a simple operation, regardless of location where the reading or the acquisition is performed, would advantageously enhance user convenience.

SUMMARY

In order to achieve the above-described object, according to one aspect of the present invention, there is provided a scanned-document management system including an information management unit that stores and manages information regarding a user; a document management unit that stores and manages an electronic document; a document reading unit; a first user identification information reading unit that acquires identification information of a user who operates the document reading unit; an attribute information generating unit that acquires, from the information management unit, information of a user identified by the user identification information acquired by the first user identification information reading unit and generates attribute information based on the acquired information of the user; a document registration unit that registers the document data and the attribute data in the document management unit; a document display unit; a second user identification information reading unit that acquires identification information of a user who operates the document display unit; a request information generating unit that acquires, from the information management unit, information of a user identified by the user identification information acquired by the second user identification information reading unit and generates, based on the acquired information of the user, document acquisition request information for identifying document data to be acquired from the document management unit; a corresponding document selection unit that selects document data related to the user from the document management unit based on document acquisition request information and the attribute information registered in the document management unit; and a display control unit that displays the selected document data on the document display unit.

According to another aspect of the present invention, there is provided a storage medium readable by a computer, the storage medium storing a read-document management program executable by the computer to perform a function for a read-document management system including an information management unit that stores and manages information regarding a user, a document management unit that stores and manages an electronic document, a document reading unit, and a first user identification information reading unit that acquires identification information of a user who operates the document reading unit, and a document display section having a document display unit and a second user identification information reading unit that acquires identification information of a user who operates the document display unit, the function including: acquiring identification information of a user who operates the document reading unit; acquiring, based on the information management unit, information of the user; generating attribute information based on the acquired information of the user and the user identification information; and registering the document data in the document management unit.

According to a further aspect of the present invention, there is provided a storage medium readable by a computer, the storage medium storing a read-document management program executable by the computer to perform a function for a read-document management system including an information management unit that stores and manages information regarding a user, a document management unit that stores and manages an electronic document, a document reading unit, a first user identification information reading unit that acquires identification information of a user who operates the document reading unit, a document display unit, and a second user identification information reading unit that acquires identification information of a user who operates the document display unit, the function including: instructing the second user identification information reading unit to acquire identification information of a user who operates the document display unit; acquiring information of the user from the information management unit; generating document acquisition request information for identifying document data to be acquired from the document management unit based on the acquired information of the user; selecting document data related to the user from among document data registered in the document management unit based on the document acquisition request information and attribute information registered in the document management unit; and displaying the selected document data on the document display unit.

According to another aspect of the present invention, there is provided a method for managing a scanned document including storing information regarding a user; acquiring identification information of a first user who instructs scanning of a document; acquiring information regarding the first user from the stored information regarding a user; generating attribute information based on the acquired identification information and the information regarding the first user; registering the scanned document and the attribute information; acquiring identification information of a second user who requests displaying of a registered document; specifying information regarding the second user from the stored information regarding a user; identifying the document to be displayed based on the specified information regarding the second user and the attribute information, from among registered documents; and displaying the identified document.

BRIEF DESCRIPTION OF THE DRAWINGS

An embodiment of the present invention will be described in detail by reference to the following figures, wherein:

FIG. 3 is a diagram showing an example of information held by a database of an information management server according to the first embodiment;

FIG. 8 is a diagram showing an example of information held by a database of an information management server according to a second embodiment of the present invention;

FIG. 9 is a diagram showing transition of a screen displayed on a multifunction device during a document scanning process in the second embodiment.

DETAILED DESCRIPTION OF THE INVENTION

Embodiments of the present invention will be described hereinafter with reference to the drawings.

First Embodiment

Figure 1:
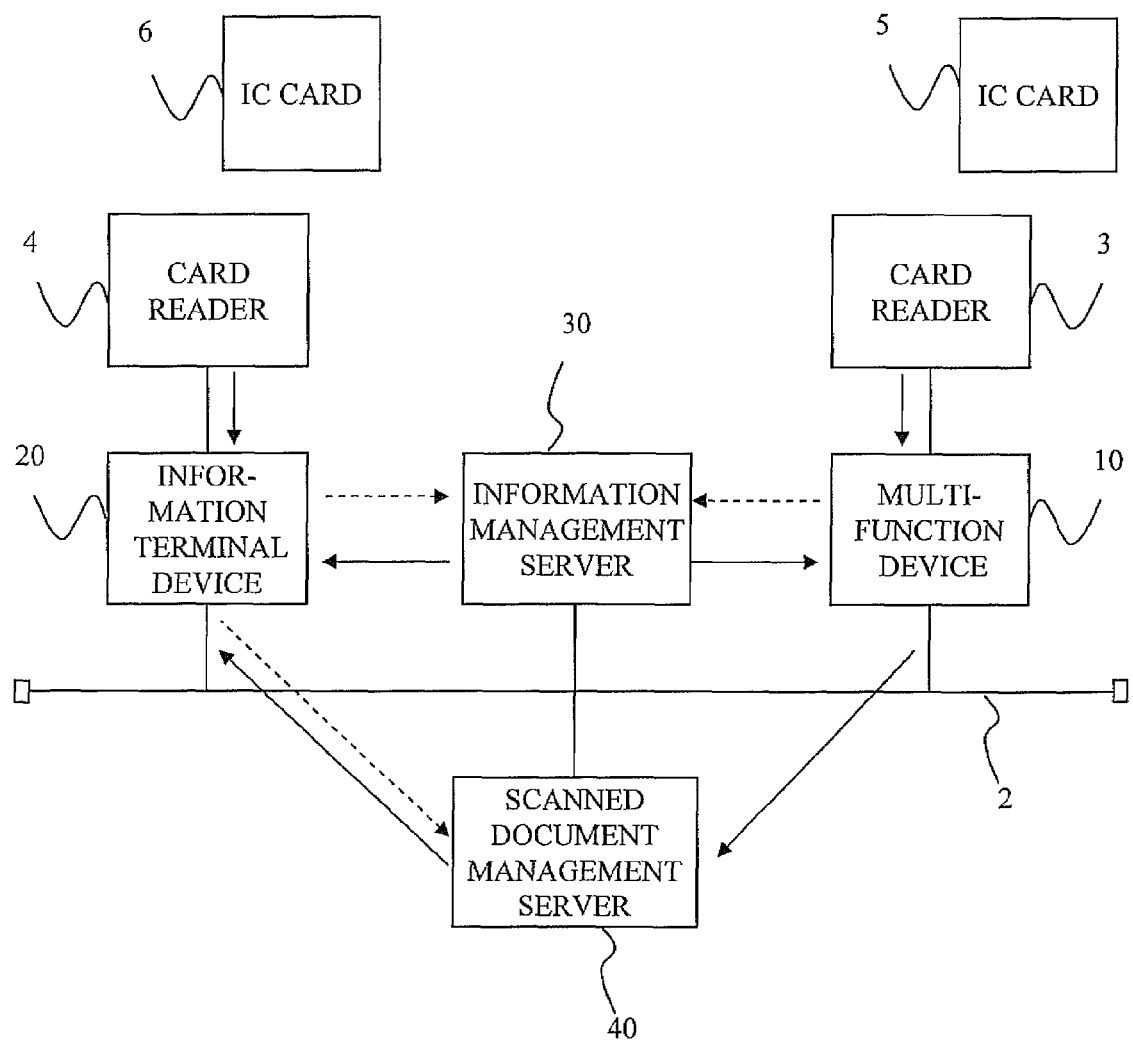
FIG. 1 is a diagram showing the overall configuration of an electronic conference system to which a document scan management system according to a first embodiment of the present invention is applied.

FIG. 1 is a diagram showing the overall configuration of an example document scan management system according to a first embodiment of the present invention. In the present embodiment, an example will be described in which the document scan management system is applied to an electronic conference system, such as that commonly known as a teleconferencing system. An electronic conference system as referred to in the present embodiment may be any system which handles electronic data by use of an information device such as a multifunction device or a PC. As the term is used in its broadest sense, it should not be presumed that a conference is performed between remote areas via a telephone circuit or a network. The electronic conference system in the present embodiment has a constitution in which a multifunction device 10, an information terminal device 20, an information management server 30, and a scanned document management server 40 are connected to one another via a local area network (LAN) 2. It is to be noted that in FIG. 1, "broken-line" arrows show paths of requests, and "solid-line" arrows show paths of information flow. The multifunction device 10 is an information device having a built-in computer provided with a scanner function, a network communication function, and the like in addition to a copying function, and is connected to a card reader 3. In the present embodiment, it is assumed that the system is installed in a conference room or in the vicinity of the conference room. The information terminal device 20 is a PC brought by a user or installed in the conference room, and is connected to a card reader 4. The information management server 30 stores and manages various pieces of information such as information on the user, information on a location where the multifunction device 10 is installed, and information on the conference room and the conference. The multifunction device 10 prepares attribute information on the basis of information acquired from the information management server 30 or the like, and adds the attribute information to document data (scanned document) read by the multifunction device 10 to thereby prepare document registration information. Meanwhile, the scanned document management server 40 accumulates the document registration information sent from the multifunction device 10 in an internal document information database, to thereby store the information. No particular limitations are imposed on the locations of the information management server 30 and the scanned document management server 40, so long as the servers can be accessed from the conference room via the network. The respective card readers 3 and 4 read user identification information (hereinafter referred to as "user IDs") recorded in IC cards 5 and 6, respectively.

Although a single multifunction device 10 is shown FIG. 1, it is assumed that multiple machines are connected to the LAN 2, depending on the number of conference rooms. The respective multifunction devices 10 have substantially similar constitutions. The information management server 30 holds various pieces of information in addition to user information as described in detail below. Similarly, although only one information management server is shown in FIG. 1, the server may be constituted by multiple servers. Although the information management server 30 and the scanned document management server 40 are shown as separate servers because they hold different types of information, the two servers are not necessarily separate devices.

Moreover, the network for connecting the respective computers is shown by the LAN 2, but the multifunction device 10 and the information terminal device 20 may be installed in distant locations, and therefore a public network such as the Internet may be used. Multiple LANs, or a combination of LANs and public networks, may be combined to constitute the network.

Figure 2:
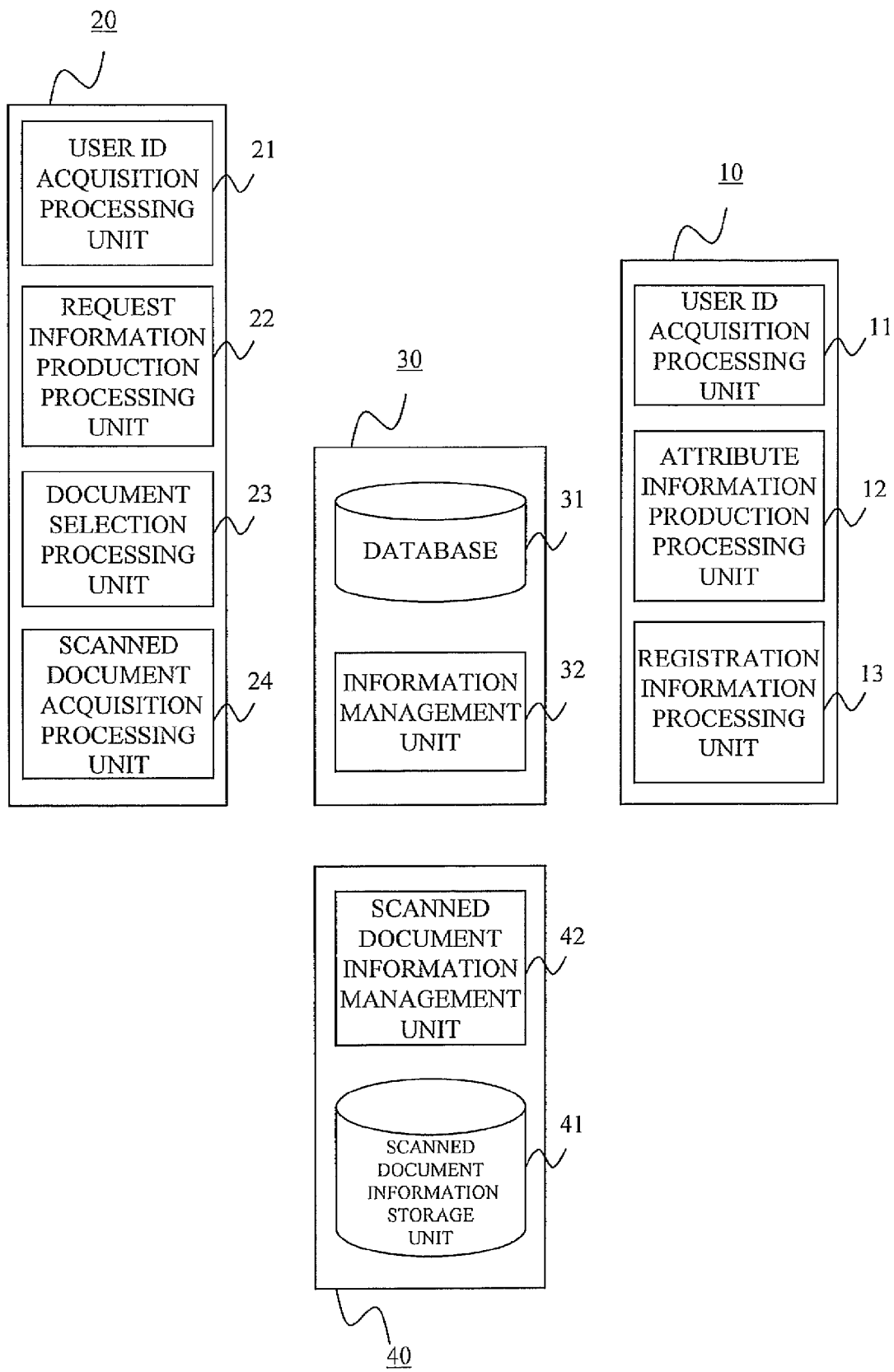
FIG. 2 is a block diagram of an electronic conference system according to the first embodiment of the present invention.

FIG. 2 is a block diagram of the electronic conference system in the present embodiment. The multifunction device 10 has a user ID acquisition processing unit 11, an attribute information production processing unit 12, and a registration information processing unit 13. It is to be noted that the multifunction device 10 obviously has a unit for performing processing of functions originally possessed by the multifunction device, such as the copying function, the scanner function, and the network communication function. This is not illustrated or described, as it is not a characteristic element of the present embodiment. Similarly, the other information devices 20, 30, and 40 are not described.

The user ID acquisition processing unit 11 acquires a user ID read by the card reader 3. The attribute information production processing unit 12 acquires from the information management server 30 information such as the user information specified by the acquired user ID, and produces attribute information including the acquired information and the user ID. The registration information processing unit 13 adds the produced attribute information to the scanned document, and transmits the information to the scanned document management server 40 to thereby register the information. The processing functions of the respective units 11 to 13 are realized by cooperation of a computer of the multifunction device 10 and a CPU of the computer.

The information terminal device 20 has a user ID acquisition processing unit 21, a request information production processing unit 22, a document selection processing unit 23, and a scanned document acquisition processing unit 24. The user ID acquisition processing unit 21 acquires the user ID read by the card reader 4. The request information production processing unit 22 produces document acquisition request information for acquiring information required for uniquely specifying the scanned document extracted from the scanned document management server 40. The document selection processing unit 23 collates the document acquisition request information (attribute information) collected by the information terminal device 20 with each piece of attribute information of the scanned document registered in the scanned document management server 40 to thereby select the scanned document related to a document acquirer; that is, the scanned document regarded as an acquisition object by the document acquirer. The scanned document acquisition processing unit 24 extracts the selected scanned document from the scanned document management server 40.

The information management server 30 is a server computer which stores and manages information required for operating the electronic conference system, such as user information and scanner information described later. When, as described below, various types of information are missing, the missing information must be reconstructed, and can be assumed to be the existing information in an ordinary electronic conference system. This effective utilization of the existing information is regarded as one characteristic of the present embodiment. In FIG. 2, the information are integrated and shown as a database 31. An information management unit 32 extracts necessary information from the database 31 in response to requests from the multifunction device 10 and the information terminal device 20 to transmit the information. The information management unit 32 manages the information held in the database 31 in this manner. A processing function of the information management unit 32 is realized by cooperation of the server computer with a program operated in the CPU mounted on the server computer.

The scanned document management server 40 is a server computer which stores and manages the document registration information prepared by the multifunction device 10. The scanned document management server 40 comprises a scanned document information storage unit 41 which stores the scanned document and the attribute information based on the document registration information sent from the multifunction device 10, and a scanned document information management unit 42 which performs management of information held by the scanned document information storage unit 41, such as registration of the information into the scanned document information storage unit 41 and the extraction and transmission of the necessary information from the scanned document information storage unit 41 in response to the request from the information terminal device 20. The processing function of the scanned document information management unit 42 is realized by cooperation of the server computer with a program operated in the CPU of the server computer.

FIG. 3 is a diagram showing an example of information held by the database 31 of the information management server 30. FIG. 3 shows conference information, user information, and scanner information (conference room information). Here, "conference" refers to information for identifying a conference in which the user has as a member. In FIG. 3, for each conference there are registered identification information (hereinafter referred to as the "conference ID") of the conference, a conference name, a list of participants, a location, a start time, and an end time. Among them, under the conference name, there is set information which is text information for identifying the conference and which plainly represents the purpose, agenda, and the like of the conference, such as "commodity development" and "design review". For the member, the user ID of the user who participates in the conference is set. For the location, there is set a conference room in which the conference is being held or is scheduled to be held. Under the start time, there are set a date and time at which the conference has started or is scheduled to start. A blank space means that the pertinent information has not been determined. Under the end time, the end date and time of the conference are set. If the start date and time have been set and the end date and time have not been set, the conference is being held. When neither a start date and time nor an end date and time are set, the conference has not yet started. Obviously, flag information may be used which indicate that the conference is being held, is scheduled, or has finished. In the present embodiment, for the sake of convenience information on the conference and information on status of the conference are integrated and managed in a table, but this information may be managed in separate tables, respectively. Information on the status of conference which has finished is accumulated in a history database (not shown).

For the user information, the user ID, the conference ID of the conference in which the user participates, and the user's present location information are associated and set. As shown in FIG. 3, a single user may participate in a plurality of conferences. Locations of the card readers 3 and 4 have been set beforehand, so that the current location of each user can be obtained when his or her user ID is sent from any of the respective devices 10, 20 at a time of a reading operation of the IC card 5. The information on the conference in which each user participates may be handled as personal information, such as name and department (not shown). However, in the present embodiment, for convenience of description the user information is constituted as shown in FIG. 3.

In the scanner information are set scanner identification information (hereinafter referred to as the "scanner ID") which can specify a scanner, and information on the location where the scanner is installed.

The conference room information includes a set of identification information (hereinafter referred to as the "conference room ID") capable of specifying a conference room, information on where the conference room is located, and the ID of the scanner to be installed. It is to be noted that when each multifunction device 10 is installed in a respective conference room, the scanner information and the conference room information may be formed in a single table. It is to be noted that the information on the location is shown by characters as in, for example, "Akasaka 10F", but may be longitude and latitude information so as to simplify distance calculations performed by the computer.

In the present embodiment, one of the characteristics is that the scanned document is held and managed by the scanned document management server 40 so that the information on a scanned document can be easily used in another conference room. However, in actual electronic conference systems to which the present embodiment is applied, there may be cases in which a single user scans multiple types of documents (conference data) or in which a scanned document registered by a user is to be shared with another participant in the same conference. Therefore, in addition to applications in which a single user scans and retrieves a document at a single location, this embodiment of the invention may apply to cases wherein the scanning and retrieval of a document are performed in different locations, or by different users. An operation of the present embodiment will be described hereinafter by reference to an example in which the scanning and the retrieval of the document are performed at different locations, by different users. It is to be noted that the present embodiment can be roughly classified into document scanning processing performed when the multifunction device 10 scans the document, and scanned document acquisition processing performed when the scanned document is retrieved for use. First, document scanning processing will be described with reference to the flowchart shown in FIG. 4.

In step 110, to scan a document, the user allows the card reader 3 connected to the multifunction device 10 installed in the conference room where the user is currently located to read the user's IC card 5. When the card reader 3 reads the user ID recorded in the IC card 5, the reader sends the user ID to the multifunction device 10. The user ID acquisition processing unit 11 of the multifunction device 10 acquires the user ID sent from the card reader 3 in this manner.

Next, in step 120, the user allows the multifunction device 10 to scan a document using a scanner function.

In step 130, the attribute information production processing unit 12 transmits to the information management server 30 an information acquisition request including the scanner ID and the user ID held in the multifunction device 10.

When the information acquisition request is sent, the information management unit 32 in the information management server 30 searches the user information registered in the database 31 by using the user ID as a key to find the ID of the conference in which the user participates. The information management unit acquires the conference name specified by the conference ID. The unit also searches the scanner information by use of the scanner ID as the key to find the installation location information of the multifunction device 10. The information management unit 32 returns the information acquired in this manner to the multifunction device 10. Because the installation location of the multifunction device 10 is managed by the information management server 30, the user's present location can be updated by the user ID sent from the multifunction device 10.

When information is sent from the information management server 30 in response to the request, the attribute information production processing unit 12 in the multifunction device 10 produces information on the user, such as user ID and the conference, and information on document scanning, such as the scanner ID, the installation location information, and information of a date when the scanning was performed. In the present example, because the existing information held by the information management server 30 is acquired, the user need not perform an input operation for setting the attribute information. Needless to say, user input may be allowed, and arbitrary attribute information may be optionally included in the automatically collected attribute information. It is to be noted that when information on the multifunction device 10, such as a scanner installation location related to the document reading, is set in each multifunction device 10, internal information may be used. Therefore, the information is not necessarily acquired from the information management server 30.

In addition, because the paper document scanned in the present embodiment contains data or the like for use in the conference, it is convenient to specify the conference for which the scanned document is used. As an example method of specifying the conference, the attribute information production processing unit 12 may list and display on a liquid crystal panel of the multifunction device 10 one or multiple conference names in which the user participates, sent from the information management server 30, so that the user can select the conference name from the displayed list. Alternatively, in the information management unit 32, the conference which the user is attending or has just attended is specified from a status of the conference registered in the conference information and the user's present location specified by the user ID, and only the specified conference is sent to the multifunction device 10. In this manner, the scanned document can be associated with the conference in the multifunction device 10. Thus, the scanned document and the conference for which the document is used can be specified uniquely. The "conference" included in the attribute information by the attribute information production processing unit 12 is only one example of a conference specified in this manner.

In step 140, the registration information processing unit 13 adds to the scanned document read in the step 120 the attribute information produced by the attribute information production processing unit 12 in step 130 to thereby produce registration information. The information is sent to the scanned document management server 40. It is to be noted that the order in which the steps 120 and 130 are performed is not limited to that described above. They may be performed in reverse order, or simultaneously or in parallel with each other, before step 140 is performed.

Figures 4, 5:
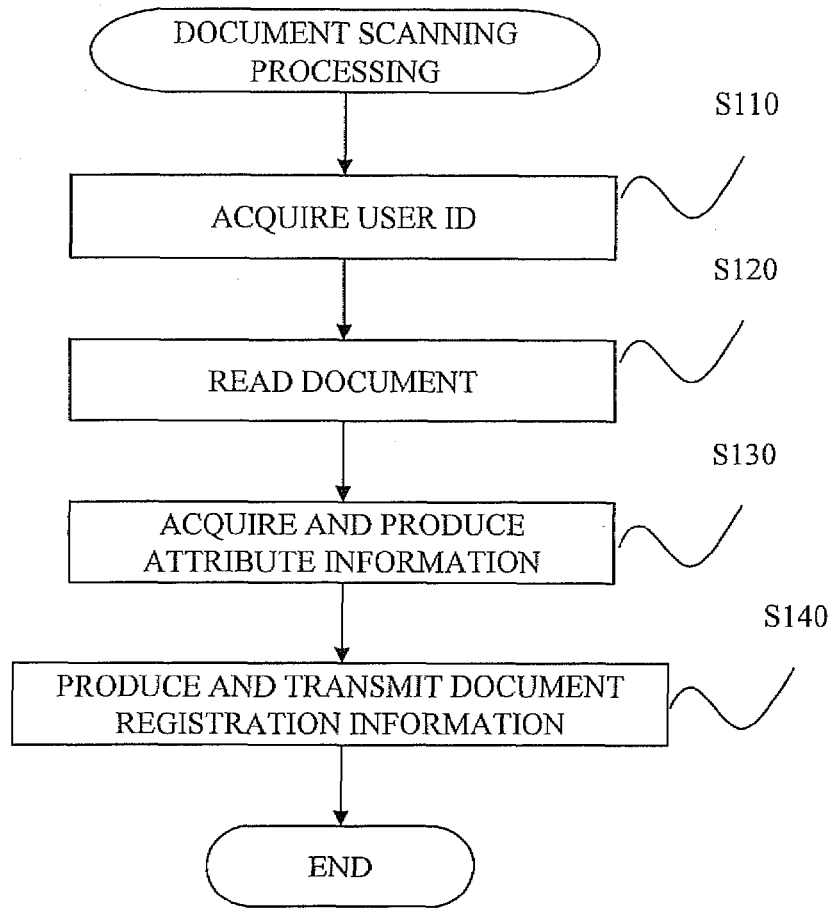
FIG. 4 is a flowchart showing processing related to scanning a document according to the first embodiment.
FIG. 5 is a diagram showing a data constitution of scanned document information registered in a scanned document information storage unit according to the first embodiment.

The scanned document information management unit 42 in the scanned document management server 40 registers in the scanned document information storage unit 41 the document registration information sent from the multifunction device 10. FIG. 5 shows an example constitution of the data of the scanned document information registered in the scanned document information storage unit 41. In FIG. 5, "document ID" is document identification information which specifies the scanned document. In the present embodiment, the storage location of the scanned document is set and registered as the document ID. "Scanning location", "scanning date", "conference", and "owner" are associated with this document ID and registered for each piece of registration information. The "scanning" location indicates where the document was scanned, and installation location information of where the multifunction device 10 is set. To "owner", a user ID is set.

As described above, in the document scanning processing in the present embodiment, the attribute information can be automatically added to the scanned document in response to the reading operation of the card reader 3 and the document. Subsequently, scanned document acquisition processing in the present embodiment will be described with reference to the flowchart shown in FIG. 6. The processing is performed when a user other than the document owner (document reader) acquires the scanned document from a location other than the location at which the document was read.

In step 210, a user other than a document owner recognizes that the document reading operation in the multifunction device 10 has completed, and allows the card reader 4 to read the user's IC card 6 for the purpose of acquiring the document. The card reader is connected to the information terminal device 20 installed in the conference room where the user is present at that point. After reading the user ID recorded in the IC card 6, the card reader 4 sends the user ID to the information terminal device 20. The user ID acquisition processing unit 21 of the information terminal device 20 acquires the user ID sent from the card reader 4 in this manner.

In step 220, the request information production processing unit 22 transmits to the information management server 30 the information acquisition request including the acquired user ID.

When the information acquisition request is sent, the information management unit 32 in the information management server 30 searches the user information registered in the database 31, using the user ID as the key, to find the ID of a conference in which the user participates. The conference name specified by the conference ID is acquired and the acquired information is returned to the information terminal device 20. It is to be noted that, because the location at which the information terminal device 20 is installed can be stored in the information management server 30, the user's present location can be updated by the user ID sent from the information terminal device 20.

When the information is sent from the information management server 30 in response to the request, the request information production processing unit 22 in the information terminal device 20 specifies only one conference with reference to the conference included in the information. This is done in order to specify what conference is to be held in the conference room in which the user is now located; in other words, to specify the conference that the user should attend. Moreover, when the conference is specified, the scanned document to be acquired from the information management server 30 can be specified. Here, when the user has a single conference to attend, the conference can be uniquely specified. In contrast, when the user has multiple conferences to attend, the request information production processing unit 22 lists and displays multiple conference names in a display of the information terminal device 20, so that the user may select one name from the list. The user interface that displays the conference names may be constructed using existing technology. Even if the user does not select the information, the conference information allows identification of which conference is now being held in which conference room. However, there is a possibility that multiple conferences in which the user participates are held simultaneously in parallel with one another and the user attends one of those conferences. Therefore, in the present embodiment, the user is allowed to select one conference in such a manner as to contemplate any situation. It is to be noted that a scanned document can be specified by merely user ID in a case where a document owner registers only one scanned document in the scanned document management server 40, and the document owner retrieves the scanned document.

Subsequently, the request information production processing unit 22 transmits to the information management server 30 the information acquisition request including the specified conference.

When the information acquisition request is sent, the information management unit 32 in the information management server 30 searches the conference information registered in the database 31 by use of the conference as the key, retrieves the ID of the user who participates in the conference and the location, and transmits this information to the information terminal device 20.

Figures 6, 7:
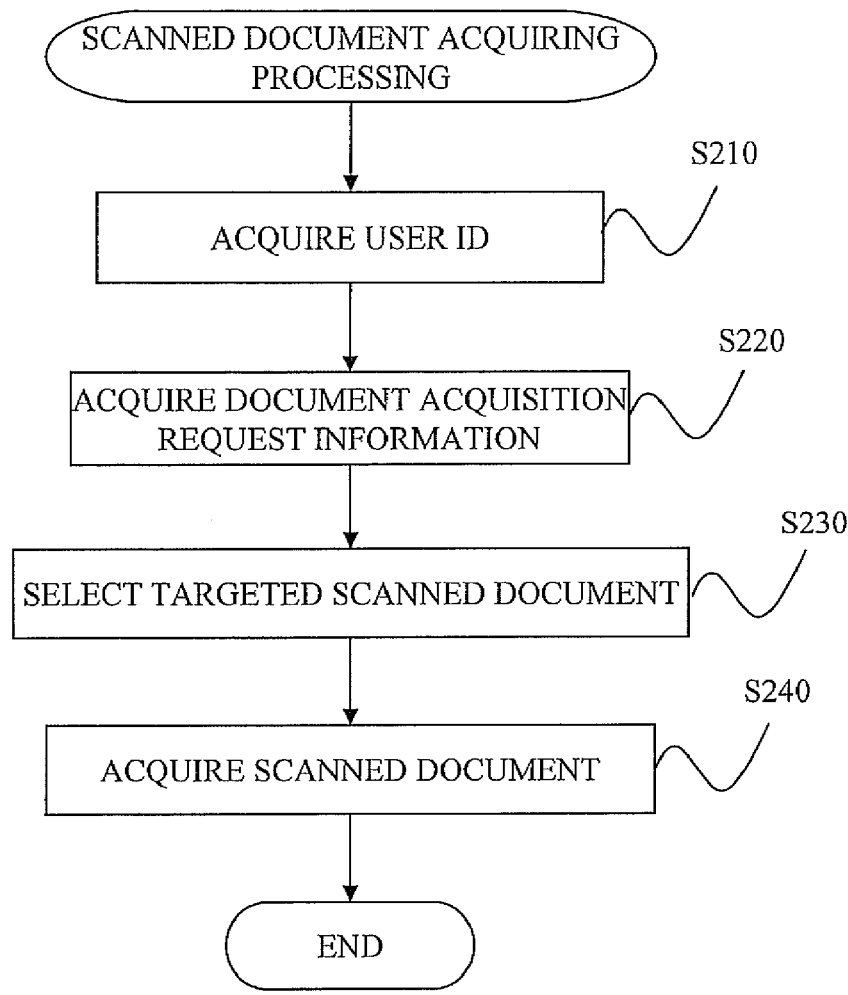
FIG. 6 is a flowchart showing example processing of the first embodiment when a scanned document is acquired.
FIG. 7 is a diagram showing an example constitution of attribute information acquired by an information terminal device according to the first embodiment.

The request information production processing unit 22 in the information terminal device 20 acquires the attribute information for finding the corresponding scanned document from the scanned documents registered in the scanned document management server 40 by reference to the information sent from the information management server 30 in response to the request. FIG. 7 shows an example constitution of the information acquired by the information terminal device 20. Through the above-described processing, there are acquired the location where the conference to be attended by the user is to be held, a document acquisition request date to set the present time which can be acquired from the information terminal device 20, the name of the conference, and the users who attend the conference. The request information production processing unit 22 produces from the input user ID the document acquisition request information including the attribute information shown in FIG. 7.

In step 230, the document selection processing unit 23 specifies the scanned document to be acquired from the scanned documents stored in the scanned document management server 40, as follows. Attributes to be considered in specifying the document will be described.

First, in this example, a user other than the document owner can acquire the document. Therefore, for example, there arises a need that not only owner "u1" but also members of conference bodies "m1" and "m2" in which the owner u1 participates, be permitted to acquire the scanned document of the owner "u1". In the same manner, "Conference location" (acquiring place of the scanned document) of the conference need not necessarily match the document reading location. Meanwhile, because a conference is a subject to the user of the scanned document, "conference" included in the user information of "u1" and that of a user who acquires the document must correspond. As to date, when "scanning date" is close to a utilizing date, the document is more likely to be utilized. Therefore, combination of "location", "conference name", "member", and date of request information may determine the selected document. Therefore, in the present embodiment, the scanned document to be acquired can be specified as follows.

Assume that among attributes of the scanned document, a set of the "location" is P, a set of the "date" is T, a set of the "conference" is M, a set of the "user" constituting the conference is U; $p \in P$, $t \in T$, $m \in M$, and $u \in U$. The attribute of a set of quadruplets $<p, t, m, u>$ is extracted with respect to individual scanned documents. Similarly, assuming that a set of user's sub-sets is S, and s ∈ S, the information terminal device 20 extracts the attribute of a set of quadruplets <p, t, m, s>. Here, it is assumed that the attributes of the scanned document are <p1, t1, m1, u1> and the attributes of the information terminal device 20 are <p2, t2, m2, s2>. Moreover, two functions δ and in are defined as follows:

$$\delta(x, y) = 0 \text{ or } 1, \text{ wherein the function is 0 if } x=y, \text{ and is 1 otherwise;}$$

$$in(u, s) = 0 \text{ or } 1, \text{ wherein the function is 0 if } u \in S, \text{ and is 1 otherwise.}$$

Furthermore, a distance f of the scanned document is defined as follows:

$$f(<p1, t1, m1, u1>, <p2, t2, m2, s2>) = a*\delta(p1, p2) + b*|t1-t2| + c*\delta(m1, m2) + d*in(u1, s2),$$

wherein a, b, c, and d are weighting coefficients which can be arbitrarily set by the user. In the present embodiment, as to the distance function f, distances between attribute values <p2, t2, m2, s2> held by the information terminal device 20 and attribute values <p1, t1, m1, u1> of the respective scanned documents stored in the scanned document management server 40 are calculated respectively. It is assumed that the scanned document for which the calculation result produces the smaller value is the scanned document to be acquired this time. That is, the calculated distance f is a function value indicating a relationship between the attribute information held by the information terminal device 20 and that of each scanned document stored in the scanned document management server 40. A smaller value indicates a greater degree of correlation (relation is stronger). That is, there is a high probability that the document corresponds to the scanned document desired this time.

Here, each term will be described. First, in the distance function f of the scanned document, a first term a*δ(p1, p2) concerning the "location" is 0 when the document acquisition location is the same as the document scanning location. The first term is 1 when the locations are not the same. This location is calculated by use of geographic position information such as latitude, longitude, and altitude information, or a name (character string) uniquely applied to a location such as a specific conference room or a floor of a particular building. In this case, the scanning location of the document is not necessarily the same as the retrieval location, and dependency of this location on that attribute need not be weighted heavily. That is, a coefficient a is set to a small value. In the present embodiment, the function δ is used, but other functions, such as a function producing a numeric value proportional to a distance between the locations, may be used.

A second term b*|t1-t2| concerning the "date" is a term which depends on the time elapsed from the scanning of the document. For example, if u1 scans the data of a conference m which ended at 14:00 immediately after the end of the conference, and the scanned document is immediately utilized, the term indicates a small value. When a real-time property of the information is considered important, a large numeric value may be set to a coefficient b.

A third term c*δ(m1, m2) concerning the "conference" is 0 when the conference in which the document owner participates is the same as that in which a document acquiring user participates. The third term is 1 when the conferences are not the same. In this case, since it is presumed that the scanned document is conference data of a certain conference, the "conference" must be the same. Therefore, a significantly large numeric value is set to a coefficient c.

The fourth term d*in(u1, s2) concerning the "user" is a term which depends on the conference members. To an attribute value s2 of the "user" held by the information terminal device 20, one or more members of a conference are set. In this case, because it is presumed that the scanned document is conference data of a certain conference, only members of the conference are allowed access to the data. Therefore, a very large numeric value is set to a coefficient d.

The document selection processing unit 23 calculates the distance f of each scanned document, by comparing the attributes <p2, t2, m2, s2> owned by the information terminal device 20 with the attributes <p1, t1, m1, u1> of the scanned document stored in the scanned document management server 40 as described above. Moreover, the scanned documents are listed and displayed in the information terminal device 20 in ascending order of distance. Specifically, on the screen is displayed the attribute information of each scanned document retrieved from the scanned document management server 40 during the calculation of the distance f. Because the documents are displayed in ascending order of distance f as described above, the scanned document to be acquired by the user usually must be near the top of the list for the user to easily find the scanned document to be acquired. Because the document selection processing unit 23 allows the user to select the scanned document in this manner, a scanned document acquired by the user can be specified.

In step 240, the scanned document acquisition processing unit 24 retrieves the scanned document corresponding to the specified attribute information of the scanned document from the scanned document management server 40. In this manner, the user can download the targeted scanned document into the information terminal device 20.

In the above description, the scanned documents are prioritized, listed, and displayed so that the user may select a target document. However, for security reasons, there may be a case in which it may be better not to display all of the scanned documents as selection candidates. Therefore, for example, a threshold value may be set to the distance f, and a scanned document exceeding this threshold value cannot be selected from the list, or is not displayed on the list. For example, when a value that exceeds this threshold value is preset to the coefficient d with respect to a user "u" in the distance function f, even existence of a scanned document can be kept from the user "u". The strength of the security can be easily adjusted simply by changing the weighting coefficient included in the distance function f in this manner. Although it has been described earlier, in the description of the distance function f, that the weighting coefficients a to d can be arbitrarily set by the user, the range of values settable as the weighting coefficients may be limited, in view of security.

Moreover, although in the present embodiment four items of attribute information including the user information, the location information, and the like are included in the document acquisition request information, it is not necessary that the four pieces of attribute information always be combined, but the information may be combined and used as appropriate. For example, just the user ID may be used when the same user uses a document at one location, as described above.

Also as described above, according to the present embodiment, the scanned document management system executes the processing when a document is acquired, in response to the reading operation of the IC card 6 from the user's card reader 4.

According to the present embodiment, the document data can be downloaded into the PC 20 without requiring the information of the type of multifunction device 10 and the address, without driver software, and without utilizing any confidential box. Especially, in the present embodiment, although the document owner can still load the document into the information terminal device 20 at the location the document is read, as described above in the example, users other than the owner can also retrieve the target scanned document from a different location, also as described above in the example. When the information management server 30 effectively utilizes the held existing information, the attribute information can be added to the scanned document without causing the user to perform an operation, such as a manual input operation.

It is to be noted that although in the example of the present embodiment the information terminal device 20 is provided with the document selection processing unit 23 to specify the scanned document in the information terminal device 20, there may also be employed a constitution in which the attribute information <p2, t2, m2, s2> of the information terminal device 20 is sent to the scanned document management server 40, and the scanned document is specified by the scanned document management server 40. With such a configuration, the size of the attribute information to be transferred between the information terminal device 20 and the scanned document management server 40 can be reduced. Also, the document selection processing unit 23 need not be installed on each information terminal device 20.

Second Embodiment

A second embodiment of the present invention primarily shows a specific structure of a user interface during the document scanning process and the scanned document acquisition process described in the first embodiment.

The structure of the second embodiment is basically identical with that of the first embodiment shown in FIGS. 1 and 2 and will not be described again. The scanned document management server 40 in the second embodiment is constructed to categorize, for each conference, electronic documents related to the conference and store the categorized electronic documents in the scanned document information storage unit 41.

FIG. 8 is a diagram exemplifying information stored in a database of the information management server in the present embodiment. The structure is basically identical with that in the first embodiment, except that additional information is added to the conference information and the user information. Because the scanned document management server 40 is configured to store and manage the electronic document while categorizing by conference as described above, repository information for identifying a repository provided for each conference is set in the conference information in correspondence to each conference ID, in order to allow identification of a storage destination of an electronic document. Moreover, the user information is set with a correspondence, for each user, to a card ID which is identification information of an IC card owned by the user.

Next, a document scanning process in the second embodiment will be described. Since the basic flow of the process is similar to that of the first embodiment, the process will be described by reference to the flowchart of FIG. 4, without describing the overlapping processes.

In step 110, the user allows a card reader 3 connected to the multifunction device 10 provided in the conference room where the user is currently located to read the IC card 5 of the user before the document is read. In the present embodiment, because the card ID is recorded in the IC card 5, the user ID acquisition processing unit 11 transmits the card ID to the information management server 30 for inquiry of the user ID. When the information management unit 32 of the information management server 30 receives the card ID, the information management unit 32 acquires the user ID corresponding to the card ID from the user information and returns the user ID to the multifunction device 10. The user ID acquisition processing unit 11 in the present embodiment acquires the user ID in this manner.

In the above-described first embodiment, the user ID is directly recorded on the IC card 5. In contrast, in the second embodiment the card ID is recorded on the IC card and the user information is searched, while the read card ID is used as a key, to obtain the user ID. Although the present embodiment has an increased load in that an inquiry process to the information management server 30 is required, the present embodiment also has the following advantages. Specifically, when the user, for example, loses the IC card, it is possible to immediately prohibit the use of the lost IC card by deleting, from the user information, the card ID of the IC card the user has lost. In addition, by reissuing an IC card and updating the user information with the card ID of the IC card, the user can use the electronic conference system without a problem.

In the first embodiment, steps 120 and 130 are described as being reversible; that is, steps 120 and 130 may be performed in any order or even simultaneously. In the second embodiment, as will be described, the attribute information is acquired from the information management server 30 after the user selects the scanning function of the multifunction device 10, and the document scanning process is then performed. Thus, the process of step 120 is performed before the process of step 130, or, more accurately, the processes of steps 120 and 130 are performed in a combinational manner.

FIG. 9 is a diagram showing transition of an example screen display to an operation panel (console) equipped in a multifunction device 10. Processes of steps 120 and 130 will now be described with reference to FIG. 9.

In order to read a paper document to be used in a conference by means of the scanner function of the multifunction device 10 in order to form an electronic document, the user selects the scan button displayed on the operation panel of the multifunction device 10. In FIG. 9, a GUI component surrounded by a bold line, among the GUI components such as buttons, tabs, etc. which are displayed on the operation panel and which can be selected, indicates that the GUI component has been selected by the user. Therefore, FIG. 9(a) shows, as described above, that the user has selected the scan button.

When the user selects the scan button, the multifunction device 10 displays a designation screen of a storage destination of the scanned document. In the present embodiment, as the storage destination, a "confidential box", a "conference", and "others" for selecting other storage destinations can be selected. When the user selects "conference", the attribute information production processing unit 12 transmits the user ID to the information management server 30 to inquire about the conference in which the user participates.

When the information management unit 32 of the information management server 30 receives an inquiry from the multifunction device 10, the information management unit 32 acquires, from the user information, one or multiple conference IDs corresponding to the user ID included in the inquiry, and then acquires, from conference information, the names of conferences identified by the one or multiple acquired conference IDs. The information management unit 32 returns the information thus acquired to the multifunction device 10. For example, when the user ID is "u1", with the example setting of FIG. 8, the information management unit 32 returns "Commodity Development" and "Patent Investigation" specifying the conferences in which the user of user ID "u1" participates.

The attribute information production processing unit 12 displays, in the form of a list, the name(s) of the conference(s) acquired in this manner in a predetermined display region of the operation panel as shown in FIG. 9(*b*).

Then, when the user selects one of the conferences displayed in the list, such as "Commodity Development" as shown in FIG. 9(*b*), the attribute information production processing unit 12 displays the conference repository and file name of the storage destination to which the document to be read is to be stored, as shown in FIG. 9(*c*). Because it is not necessary to present the actual repository represented by a URL or the like to the user, in FIG. 9(*b*), a configuration is employed in which the name of the conference is displayed as a virtual name of the repository. Here, the file name to be attached to the scanned document is automatically generated by the attribute information production processing unit 12. The generation process of the file name will be described later.

When the user selects a scan start button after confirming the information related to registration of the scanned document displayed on the screen (conference repository and file name), the multifunction device 10 instructs the scanner mechanism to operate so as to perform the reading process of the paper document, and, at the same time, instructs the attribute information production processing unit 12 to transmit to the information management server 30 an information acquisition request including the scanner ID stored internally in the multifunction device 10 and the user ID. As described above with respect to the first embodiment, attribute information including information related to the user such as the user ID and conference and information related to the document reading such as the scanner ID, information of the installation location, and information on scanned date and time is automatically generated on the basis of the information transmitted from the information management server 30. As is explained with reference to FIG. 9(*b*), the attribute information can identify the conference in which the user participates, and, thus, information related to the identified conference will be included in the attribute information.

In step 140, a registered information registration processing unit 13 adds to the scanned document the attribute information generated by the attribute information production processing unit 12 and generates the document registration information. A file name designated from the screen shown in FIG. 9(*c*) is attached to the file corresponding to the document registration information. This file is transmitted to the scanned document management server 40 and is stored in the repository of the corresponding conference.

In the first embodiment, as a method of identifying the conference to which the scanned electronic document pertains, a method has been described in which a list of conferences in which the user having the IC card participates is displayed on the liquid crystal panel of the multifunction device 10 and the user selects a conference. In the second embodiment, a specific example of this method is described.

In the second embodiment, as is clear from the above description, information including the user ID, the name of a conference in which the user participates at a particular stage of the conference, and attribute information in the attribute information production stage are acquired in steps 110 and 130 from the information management server 30. This is because it is unclear whether or not the user would select "conference" in FIG. 9(*b*) after the user allows reading of the IC card, and, thus, the system is configured so that the necessary information is acquired at a necessary timing after the scan function is selected. If it is desired to reduce the number of accesses to the information management server 30, it is also possible to employ a configuration in which all information related to the user corresponding to the card ID is acquired from the information management server 30 when the user ID is acquired, on the basis of the card ID.

The file name to be attached to the scanned document will now be described. As shown in FIG. 9(*c*), the conference repository to which the document to be read is to be stored and the file name are displayed on the screen. Because the user has selected a document scan in FIG. 9(*a*), it is possible to identify that the electronic document to be stored is a scanned document, and, thus, the attribute information production processing unit 12 in the second embodiment automatically generates a file name by combining "scanned document" explicitly indicating the type of the scanned file and the time information at the time of reading of the scanned document. In reality, more strictly speaking, because the document has not yet been scanned, the time information is time information indicating the current time. The time information is included in the file name in order to distinguish the scanned document from other documents, and, thus, in FIG. 9(*c*), only the year, the month, and the date are attached to the document type such as "Y1M1D1". It is also possible to further add time data such as the hour, the minute, and the second in order to more reliably avoid generation of overlapping file names. In addition, because the only requirement is that a unique file name be attached to the scanned document, the file name may be automatically generated according to a predetermined naming rule, such as sequential number generation.

In the present embodiment, the multifunction device 10 corresponding to the document reading computer, in general, is not suited for input operation of the file name, because the multifunction device 10 may not have the alphabet keys. Therefore, in the present embodiment, for convenience of the user the attribute information production processing unit 12 automatically generates unique file names according to a predetermined naming rule as described above. Alternatively, it is also possible to employ a configuration in which the user determines and attaches the file name. In FIG. 9(*c*), the file name is surrounded by a rectangle. The rectangle indicates an input and display region of the file name. The user can set and change the file name to a desired file name through a predetermined input operation, so long as the file name maintains its uniqueness within the repository of the conference to which the file is stored in the scanned document management server 40.

Next, a scanned document acquisition process in the second embodiment will be described. The basic flow of processes is identical with that in the first embodiment and, therefore, the second embodiment will be described according to the flowchart of FIG. 6 while suitably omitting the description of overlapping processes.

In step 210, the user allows the card reader 4 connected to the information terminal device 20 provided in the conference room where the user is currently located to read the IC card 6 owned by the user in order to acquire a document. In the present embodiment, because the card ID is recorded on the IC card 6, the user ID acquisition processing unit 21 of the information terminal device 20 transmits the card ID to the information management server 30 to acquire the user ID, similar to the user ID acquisition processing unit 11 during the document scanning process. Then, the user applies a selection operation according to the displayed content on the display of the information terminal device 20 to acquire a desired electronic document.

Figure 10A:
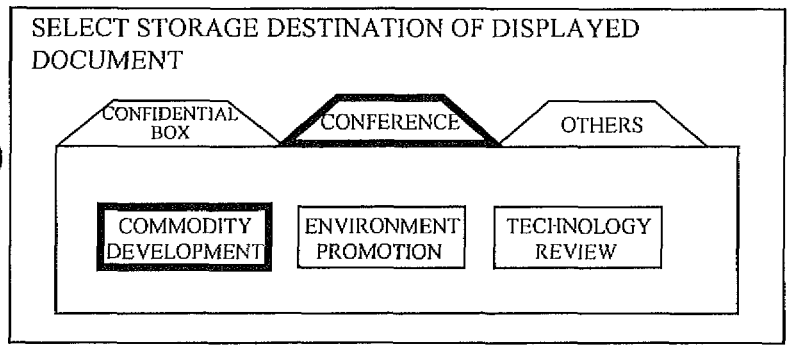
FIG. 10 is a diagram showing transition of a screen displayed on an information terminal device during a scanned document acquisition process in the second embodiment.

FIG. 10 is a diagram showing transition of an example screen display on the display of the information terminal device 20. After the IC card 6 is read, a screen as shown in FIG. 10(a) is shown on the display. The user designates, from the displayed screen, the storage destination of the electronic document that the user desires to acquire. In the present embodiment, as the storage destination, a "Confidential Box", a "Conference", and "Others" for designating other designation destinations are considered. When the user selects "Conference", the request information production processing unit 22 transmits to the information management server 30 an information acquisition request including a user ID.

When the information management unit 32 in the information management server 30 receives the information acquisition request, the information management unit 32 searches the user information registered in the database 31 while using the user ID as a key, retrieves the conference IDs of the conferences in which the user participates, and acquires the names of the conferences identified by the conference IDs. Then, the information management unit 32 returns the acquired information to the information terminal device 20.

Figure 10B:
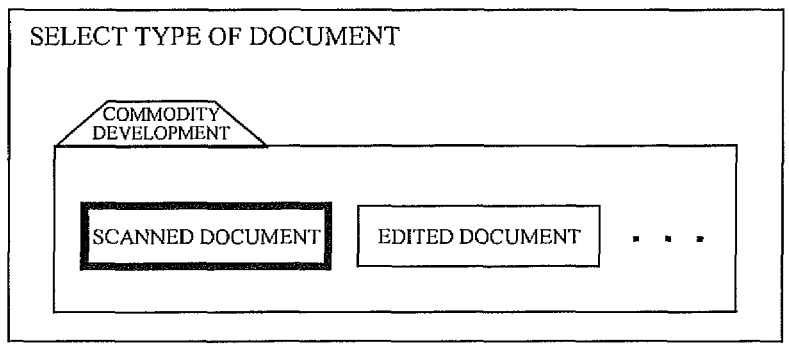

When the request information production processing unit 22 of the information terminal device 20 receives information from the information management server 30 in response to the request, the request information production processing unit 22 displays, in a predetermined display region on the display, a list of conferences included in the received information. FIG. 10(a) is an example display for the case where the user who owns the IC card 6 participates in conferences of "Commodity Development", "Environment Promotion", and "Technology Review". FIG. 10(a) shows an example display in which the "Commodity Development" conference is selected. When the user selects one of the conferences from among the conferences displayed in the list, the request information production processing unit 22 transmits the name of the selected conference to the information management server 30. The information management unit 32 of the information management server 30 searches for conference information while using as a key the conference name received by the information management unit 32, to thereby acquire the repository information of the conference, and returns the repository information. Then, the request information production processing unit 22 transmits the acquired repository information to the scanned document management server 40, to thereby acquire the type of the electronic document stored in the repository. In this manner, the type of the electronic document stored in the repository of the selected conference of "Commodity Development" is displayed in a list on a predetermined region on the screen. FIG. 10(b) shows an example display in which "scanned document" and "edited document" are shown.

When the user selects a document type at this point, the request information production processing unit 22 generates document acquisition request information including the repository information name corresponding to the selected conference and the document type. FIG. 10(b) shows a case in which the "scanned document" is selected.

In step 230, the document selection processing unit 23 identifies the scanned document to be acquired from among the scanned documents stored in the scanned document management server 40, in the following manner. In the first embodiment, the scanned document is identified through a weighted calculation using the attribute information added to the scanned document as a parameter. In the second embodiment, this process is performed in the following manner.

Specifically, the document selection processing unit 23 in the second embodiment transmits to the information management server 30 the document acquisition request information generated by the request information production processing unit 22. The information management unit 32 of the information management server 30 searches for files of the document type stored in the conference repository while using as a key the repository information included in the transmitted document acquisition request information, to thereby acquire and return the name of the corresponding file.

Figure 10C:
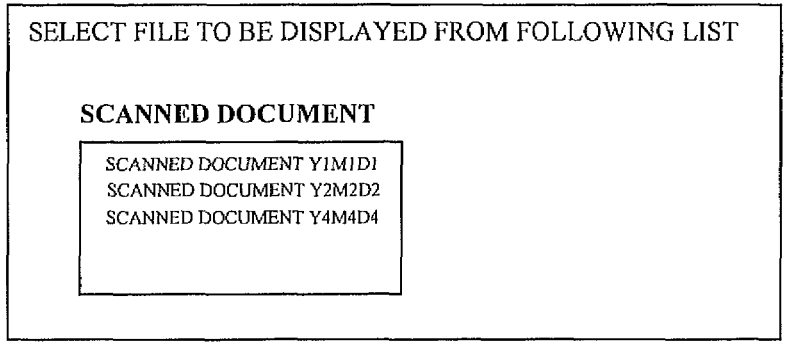

The document selection processing unit 23 displays the acquired file names in a list on a predetermined region on the screen. An example display of this screen is shown in FIG. 10(c). In the second embodiment, the target scanned document can be identified by allowing the user to select the target document from among the file names shown on the screen in the form of a list.

In step 240, the scanned document acquisition processing unit 24 retrieves the identified scanned document from the scanned document management server 40. In this manner, the user can retrieve the target scanned document to the information terminal device 20.

In this manner, the read-document management system of the second embodiment executes the processes during document acquisition in response to the user's operation to allow reading of the IC card 6 by the card reader 4.

In the above-described embodiments, a computer within the multifunction device 10 is used as the document scanning computer. The device for scanning a document includes the scanner mounted on the multifunction device 10, and the card reader 4 connected to the multifunction device 10, but a general-purpose PC may be connected to the scanner and the card reader 3 to constitute the device. Similarly, although in the above examples the user identification information reading unit is constituted by the card reader 3 which reads the user ID from the user IC cards 5 and 6, the scanner function of the multifunction device 10 may be utilized. The constitution of the user identification information reading unit can be varied as appropriate in consideration of a recording medium of the user ID. This applies to not only the document scanning device, but also the document reading device such as the information terminal device 20 and the like.

Moreover, although the embodiments have been described by reference to an example in which the read-document management system is applied to an electronic conference system, the present invention is not limited to use with electronic conferences, and is applicable to any system in which a scanned and digitized document is handled.

The present invention advantageously provides a document scan management system which is convenient for reading a document by use of a document scanning unit such as a scanner, and for otherwise acquiring or handling a scanned document.

According to one aspect of the present invention, there is provided a scanned-document management system including an information management unit that stores and manages information regarding a user; a document management unit that stores and manages an electronic document; a document reading unit; a first user identification information reading unit that acquires identification information of a user who operates the document reading unit; an attribute information generating unit that acquires, from the information management unit, information of a user identified by the user identification information acquired by the first user identification information reading unit and generates attribute information based on the acquired information of the user; a document registration unit that registers the document data and the attribute data in the document management unit; a document display unit; a second user identification information reading unit that acquires identification information of a user who operates the document display unit; a request information generating unit that acquires, from the information management unit, information of a user identified by the user identification information acquired by the second user identification information reading unit and generates, based on the acquired information of the user, document acquisition request information for identifying document data to be acquired from the document management unit; a corresponding document selection unit that selects document data related to the user from the document management unit based on document acquisition request information and the attribute information registered in the document management unit; and a display control unit that displays the selected document data on the document display unit.

According to another aspect of the present invention, there is provided a storage medium readable by a computer, the storage medium storing a read-document management program executable by the computer to perform a function for a read-document management system including an information management unit that stores and manages information regarding a user, a document management unit that stores and manages an electronic document, a document reading unit, and a first user identification information reading unit that acquires identification information of a user who operates the document reading unit, and a document display section having a document display unit and a second user identification information reading unit that acquires identification information of a user who operates the document display unit, the function including: acquiring identification information of a user who operates the document reading unit; acquiring, based on the information management unit, information of the user; generating attribute information based on the acquired information of the user and the user identification information; and registering the document data in the document management unit.

According to another aspect of the present invention, there is provided a storage medium readable by a computer, the storage medium storing a read-document management program executable by the computer to perform a function for a read-document management system including an information management unit that stores and manages information regarding a user, a document management unit that stores and manages an electronic document, a document reading unit, a first user identification information reading unit that acquires identification information of a user who operates the document reading unit, a document display unit, and a second user identification information reading unit that acquires identification information of a user who operates the document display unit, the function including: instructing the second user identification information reading unit to acquire identification information of a user who operates the document display unit; acquiring information of the user from the information management unit; generating document acquisition request information for identifying document data to be acquired from the document management unit based on the acquired information of the user; selecting document data related to the user from among document data registered in the document management unit based on the document acquisition request information and attribute information registered in the document management unit; and displaying the selected document data on the document display unit.

According to another aspect of the present invention, it is desirable that, in the storage medium, the generated attribute information further contains information related to a group to which a user indicated in the user information acquired from the information management unit belongs.

According to another aspect of the present invention, it is desirable that, in the storage medium, the generated document acquisition request information further contains information related to a group to which the user belongs, and the document data related to the user is selected from among the document data registered in the document management unit by means of comparing information related to the group contained in the document acquisition request information with information related to the group contained in the attribute information registered in the document management unit.

According to another aspect of the present invention, it is desirable that, in the storage medium, a plurality of the document reading units and a plurality of the document display units are provided.

According to another aspect of the present invention, it is desirable that, in the storage medium, when the user belongs to multiple groups, the group information is displayed in a list on the document display unit and information related to a group selected by the user is acquired.

According to another aspect of the present invention, it is desirable that, in the storage medium, during selecting the document, a difference between information included in the document acquisition request information and each piece of attribute information is determined; a priority is assigned in each relationship between the document acquisition request information and each piece of attribute information by weighting the difference and adding; the attribute information is displayed on the display unit to show the assigned priority and to allow the user to select one of the displayed attribute information; and document data corresponding to the attribute information selected by the user are acquired from the document management unit.

According to another aspect of the present invention, it is desirable that, in the scanned-document management system, the document display unit is a display unit of a conference supporting system, and the second user identification information reading unit acquires identification information of a speaker of a conference, by means of the display unit.

According to another aspect of the present invention, there is provided a method for managing a scanned document includes storing information regarding a user; acquiring identification information of a first user who instructs scanning of a document; acquiring information regarding the first user from the stored information regarding a user; generating attribute information based on the acquired identification information and the information regarding the first user; registering the scanned document and the attribute information; acquiring identification information of a second user who requests displaying of a registered document; specifying information regarding the second user from the stored information regarding a user; identifying the document to be displayed based on the specified information regarding the second user and the attribute information, from among registered documents; and displaying the identified document.

According to another aspect of the present invention, it is desirable that, in the storage medium, the functions further includes displaying groups to which a user identified by the identified user information belongs on a screen of the document reading section in the form of a list and allowing the user to select one of the groups; and registering the document data in correspondence to the group selected by the user.

According to another aspect of the present invention, it is desirable that, in the storage medium, the functions further includes presenting, to a user, a plurality of groups to which the user belongs and allowing the user to select one of the groups; presenting, to the user, a plurality of documents which are registered in a data storage unit and corresponds to the group selected by the user; allowing the user to select one of the plurality of documents; and displaying the selected document on the document display unit.

According to the present invention, even when environment setting is not performed in the computer for collecting information on the document reading unit or acquiring the document, the document data read from the document reading unit can be acquired with a simple operation.

Moreover, even when information on the user is-not set or input, the information can be conveniently acquired automatically and added to the document data.

Furthermore, even document data prepared by another user, such as a member of the same conference who belongs to the same group, can be similarly acquired in the same manner as with the document data prepared by the user. Meanwhile, because the document data that can be acquired are limited on the basis of the user identification information, acquisition or use of document data by an unauthorized party can be prevented.

Even when multiple sets of document scan data exist, the scanned document supposed to be an acquisition object can be preferentially listed and displayed. Therefore, the document data can be easily selected.

What is claimed is:

1. A scanned-document management system for an electronic conference system, comprising:
   an information management unit that stores and manages information regarding a user, the information regarding the user including user electronic conference identification information, the user electronic conference identification information identifying attendance status of the user with respect to a specific electronic conference;
   a document management unit that stores and manages an electronic document;
   a document reading unit;
   a first user identification information reading unit that acquires first user identification information of a user who operates the document reading unit, the first user identification information including identity of the user operating the document reading unit and a current location of the user based upon a location of the document reading unit being operated by the user;
   an attribute information generating unit, coupled to the information management unit and the first user identification information reading unit, that receives the first user identification information from the first user identification information reading unit and acquires, from the information management unit, the user electronic conference identification information of a user based upon the first user identification information received from the first user identification information reading unit;
   said attribute information generating unit generating attribute information based on the acquired user electronic conference identification, the generated attribute information including specific electronic conference information associated with the first user;
   a document registration unit that registers the document data and the generated attribute information in the document management unit;
   a document display unit;
   a second user identification information reading unit that acquires second user identification information of a user who operates the document display unit, the second user identification information including identity of the user operating the document display unit;
   a request information generating unit, coupled to the information management unit and the second user identification information reading unit, that receives the second user identification information from the second user identification information reading unit and acquires, from the information management unit, second user electronic conference identification information of a user based upon the second user identification information received from the second user identification information reading unit;
   said request information generating unit generating, based on the acquired second user electronic conference identification, document acquisition request information for identifying document data to be acquired from the document management unit, the generated document acquisition request information including specific electronic conference information associated with the second user;
   a corresponding document selection unit that selects document data related to the user from the document management unit based on the generated document acquisition request information and the attribute information registered in the document management unit by comparing the specific electronic conference information associated with the second user contained in the generated document acquisition request information with the specific electronic conference information associated with the first user contained in the attribute information registered in the document management unit; and
   a display control unit that displays the selected document data on the document display unit.

2. The scanned-document management system according to claim 1, further comprising a plurality of the document reading units and a plurality of the document display units are provided.

3. The scanned-document management system according to claim 1, wherein the document display unit is a display unit of a conference supporting system, and the second user identification information reading unit acquires identification information of a speaker of a conference, by means of the display unit.

4. A method for managing a scanned document for an electronic conference system comprising:
   storing information regarding a user, the information regarding the user including user electronic conference identification information, the user electronic conference identification information identifying attendance status of the user with respect to a specific electronic conference;
   acquiring first user identification information of a user who instructs scanning of a document, the first user identification information including identity of the user instructing the scanning of the document and a current location of the user;
   acquiring, based upon the first user identification information, the user electronic conference identification information regarding the first user from the stored information regarding a user;
   generating attribute information based on the acquired user electronic conference identification information, the generated attribute information including specific electronic conference information associated with the first user and information regarding the first user;
   registering the scanned document and the generated attribute information;
   acquiring second user identification information of a second user who requests displaying of a registered document, the second user identification information including identity of the user operating the document display unit;

acquiring second user electronic conference identification information of a user, from the stored information regarding a user, based upon the acquired second user identification information;

generating, based on the acquired second user electronic conference identification, document acquisition request information for identifying the document to be displayed, the generated document acquisition request information including specific electronic conference information associated with the second user;

identifying the document to be displayed based on the document acquisition request information, from among registered documents, by comparing the specific electronic conference information associated with the second user contained in the document acquisition request information with the specific electronic conference information associated with the first user contained in the registered attribute information; and displaying the identified document.

* * * * *